RADOMIR TLALKA
INVENTOR.

United States Patent Office 3,558,227
Patented Jan. 26, 1971

3,558,227
DEVICE FOR SPECTRAL ANALYSIS OF A SOLUTION
Rarodmir Tlalka, Prague, Czechoslovakia, assignor to Ceskoslovenska akademie ved, Prague, Czechoslovakia
Filed Sept. 26, 1968, Ser. No. 762,927
Claims priority, application Czechoslovakia, Oct. 16, 1967, 7,311/67
Int. Cl. G01j 3/30
U.S. Cl. 356—86     9 Claims

ABSTRACT OF THE DISCLOSURE

A device for spectral analysis of a solution with a porous rotary disk electrode and a back electrode. The rotary electrode is closed on one side and on the other side it is provided with a supply duct for the solution to be analysed and connected with a tubular drive shaft through which passes an inlet tube communicating with a container of the solution. The specific resistance of the rotary electrode is preferably 1000 to 5000$\mu\Omega$·cm. and its apparent porosity is 0.5 to 30%.

BACKGROUND OF THE INVENTION (1) Field of the invention

The invention relates to a device for spectral analysis of a solution comprising a rotary disk electrode and a counter or back electrode.

(2) Description of the prior art

Spectral analysis of a solution is a largely used and quick analytical method, but its accuracy and the reproducibility of its results are not entirely satisfactory. One of the factors affecting reproducibility and accuracy of the analysis is also the treatment and material of the electrodes.

Increasing attention is therefore given to the treatment of the electrodes. It has been found that among the electrodes used in spectral solution analysis a rotary carbon disk electrode is the most suitable one.

The rotary disk electrode generally used in spectral solution analysis is made from spectrographic carbon of a diameter larger than 10 mm. a width of 3 mm. and arranged on a shaft so as to be immersed into the solution. The electrode is of compact design and the solution forms a continuous layer on the electrode surface. The counter electrode is of cylindrical design with a conical end. This system has been used mainly for determining different elements.

Apart from carbon disk electrodes it is also known to use copper disk.

But none of the hitherto known solutions has made use of the chromatographic effect on a rotary electrode, and none of the hitherto used types of disk electrodes has permitted continuous spectrographic examination of the kinetics of chemical reactions directly in the electrode. It has also not been known to feed the solution through the electrode axis and to force it upon the surface of the electrode for the purposes of chromatographic concentration of the solution.

SUMMARY OF THE INVENTION

It is a general object of the invention to make possible continuous spectrographic examination of the kinetics of chemical reactions directly in an electrode.

Another object of the invention is chromatographic concentration of an analysed solution fed through the electrode axis and forcing it upon the surface of the electrode.

Still another object of the invention is to provide a device for achieving the above objects.

This device comprises a rotary disk electrode and a back electrode. The rotary disk electrode is made of porous spectrographic carbon or graphite, or of a conductive chromatographic material. One side of the disk electrode is provided with a duct for the supply of the analysed solution. The disk electrode is connected with a tubular driving shaft through which passes a feed tube which is connected by another tube to a container of a solution provided with a tap. On the other side the electrode is closed.

Another feature of the device in accordance with the invention reisdes in the fact that the porous rotary disk electrode has an apparent porosity of 0.5–30% and a specific resistance of 1000 to 5000$\mu\Omega$·cm.

BRIEF DESCRIPTION OF THE DRAWING

The invention will be best understood from the following specification to be read in conjunction with the accompanying drawing illustrating schematically a preferred example of embodiment of a device for spectral analysis of a solution.

In the drawing.

DESCRIPTION OF THE PREFERRED EMBODIMENT

Figure 1:
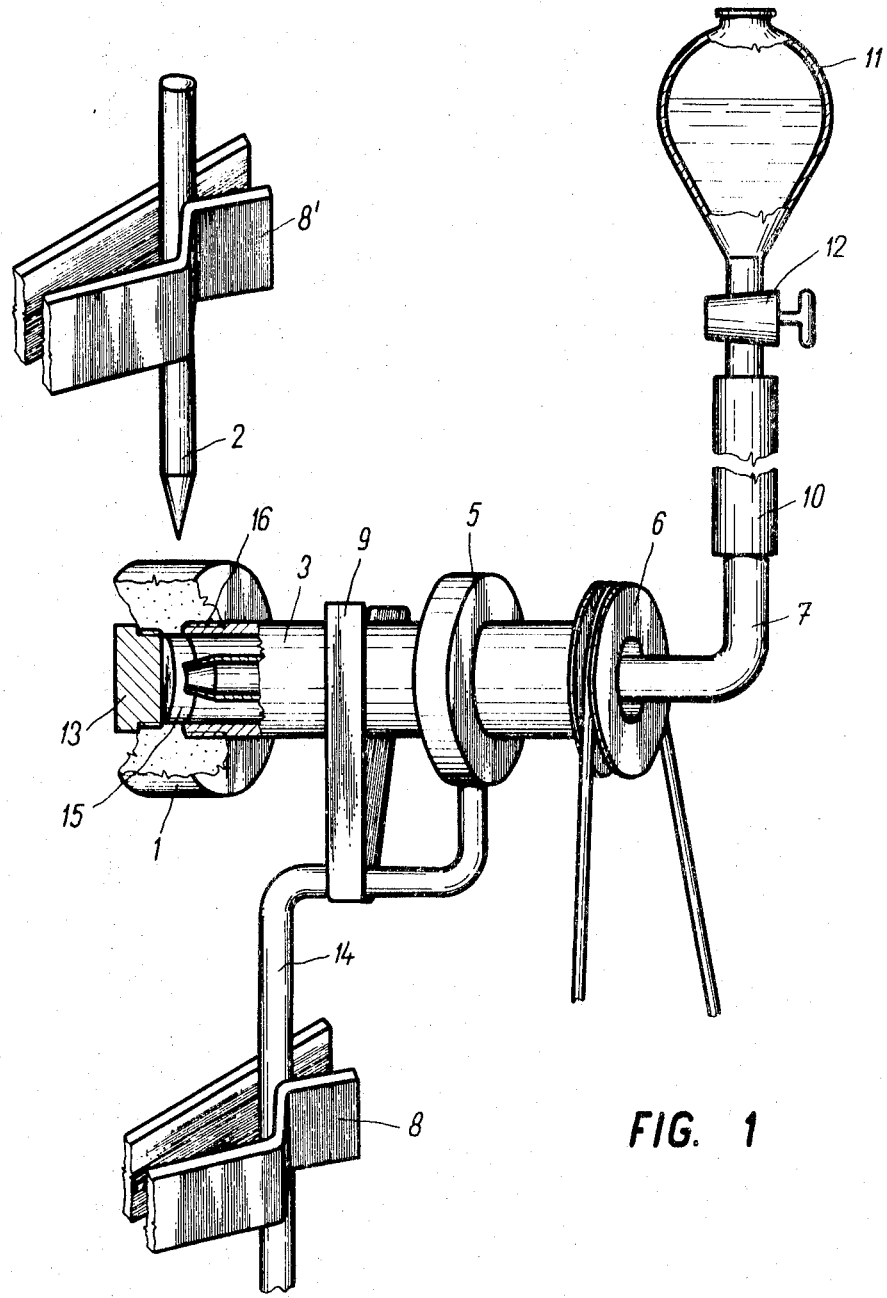
FIG. 1 is an overall perspective view of the entire device.

Referring now more particularly to FIG. 1, it can be seen that the device for spectral analysis of a solution comprises a porous rotary disk electrode 1 made of porous spectrographic carbon, graphite or of a conductive chromatographic material and a cylindrical counter electrode 2 terminated with a cone. The porous rotary disk electrode 1 is provided with a coaxial duct or cavity 15 which is closed on one side, and open on the other side of the disk for supplying the solution to be analyzed into the electrode 1 in the direciton of the axis. To this electrode is connected by means of a metric screw-thread 16 a tubular drive shaft 3 to communicate with the open end of the cavity, and shaft 3 is set in a bearing 5 and driven through a transmission 6, for example a belt, a Bowden wire or a geared transmission, by means of a synchronous motor. Into the drive shaft extends an inlet tube 7 for the solution to be analyzed and tube 7 is further connected by a tube 10, for example a flexible one, with a container 11 of the soluiton or chemical agent, for example a shaker. The supply is controlled by a tap 12.

The device is connected to a clamp 8 by means of an arm 14 which is attached to the bearing 5. This arm 8 carries brushes 9 for supplying an excitation voltage. Part of the arm 14 between the bearing 5 and the brushes 9 is made from non-conductive material, for example Teflon. The counter electrode is attached to the upper clamp 8'.

Figure 2:
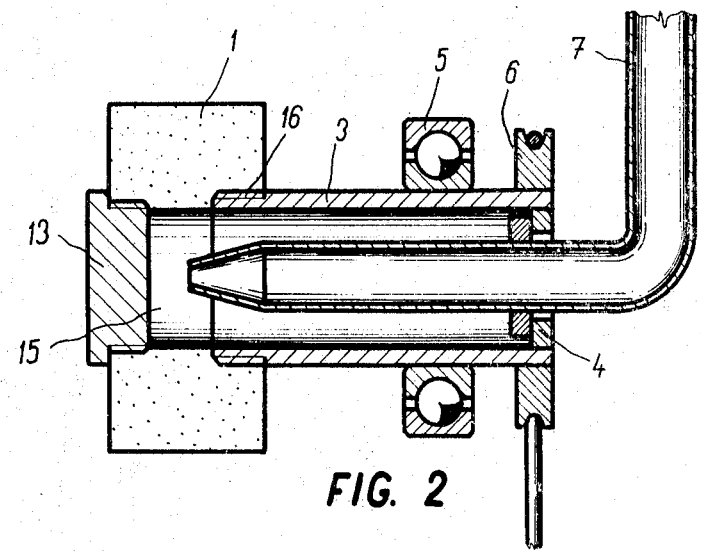
FIG. 2 illustrates one example of the arrangement of a porous rotary disk electrode in accordance with the invention.

FIG. 2 illustrates a section through a part of the device comprising a porous rotary disk electrode 1 which is provided with a duct for supplying the solution to be analyzed. The duct 15 is closed on one side by a plug 13. Into the opposite end of this duct 15 there extends the mouth of the inlet tube 7 for the solution to be analyzed and tube 7 passes through the tubular drive shaft 3 which is connected with the electrode 1 by means of a metric screw-thread 16. The inlet 7 is sealed by a seal 4.

Figure 3:
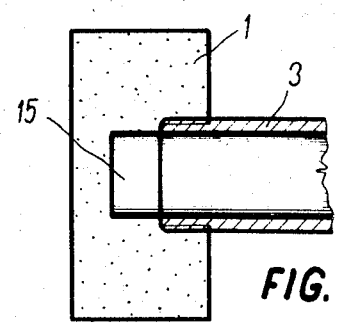
FIG. 3 illustrates another example of such a disk electrode.

FIG. 3 illustrates an example in which a porous rotary disk electrode 1 pressed out from a single piece and arranged on the shaft 3.

Figure 4:
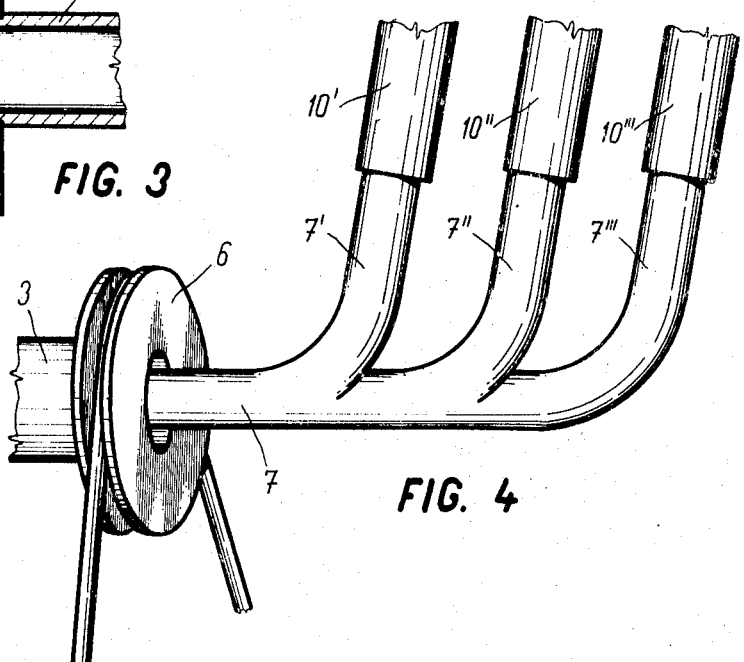
FIG. 4 shows an example of arranging the supply of an analysed solution.

FIG. 4 illustrates a modified inlet for the solution to be analyzed. The inlet tube 7 passes through the shaft 3 and after the shaft it divides into branches 7', 7'', 7''' which are further connected with containers of the analysed solution by means of flexible tubes 10', 10'', 10'''.

The function of the device for spectral analysis of a solution in accordance with the invention will now be explained with reference to FIG. 1.

A solution to be analyzed flows from the container 11 through the tube 10 and the inlet 7. It reaches the porous rotary disk electrode 1 through the duct 15 in the direction of the axis of the electrode 1. Then it is forced through the material of the porous rotary disk electrode 1 in the radial direction of this electrode to its periphery.

The periphery of the electrode is then sparked and the discharge is exposed by a spectrograph like in the case of an ordinary rotary electrode.

The analysed solution is forced through the axis of the porous disk rotary electrode 1 in the direction to the surface of the electrode under a pressure of 80 to 100 mm. of the water column. The electrode is heated by excitation current from a spectrographic generator to a temperature above 200° C.

During passage through the material of the porous rotary disk electrode 1 there occurs chromatographic concentration of a very diluted solution like in a chromatographic microcolumn.

If several solutions which are to react are to be studied, the reaction can take place either in the container 11 or directly in the porous rotary disk electrode 1. In the second case a branched inlet tube of the solutions as illustrated in FIG. 4 may be used.

The advantage of the device for spectral analysis of a solution in accordance with the invention resides in the fact that it permits to concentrate highly diluted solutions of cations 10 times to 100 times without preceding time consuming operations which cannot be achieved by existing methods.

Another advantage resides in the fact that the reaction of cations can be achieved directly in the electrode and that it is possible to examine their kinetic behaviour.

The most important advantage of the invention resides in the fact that the device for spectral analysis of a solution in accordance with the invention permits to achieve a more precise quantitative spectral analysis of solutions. This permits a great speeding up and a more precise work in analytical and other research laboratories.

I claim:

1. In a device for spectral analysis of a solution comprising a rotary disk electrode of porous material and provided with a central axially extending cavity closed at one end and open at the other end thereof; means for continuously feeding a solution to be analyzed through said open end into said cavity; means for rotating said disk about its axis; a solid counterelectrode spaced from the peripheral surface of said disk; and means for supplying current to said electrodes.

2. A device as claimed in claim 1, in which said porous rotary disk electrode is made from spectrographic carbon.

3. A device as claimed in claim 1, in which said porous rotary disk electrode is made from spectrographic graphite.

4. A device as claimed in claim 1, in which said porous rotary disk electrode is made from conductive chromatographic material.

5. A device as claimed in claim 1, in which said porous rotary disk electrode has a specific resistance of 1000 to 5000 $\mu\Omega$·cm. and an apparent porosity of 0.5 to 50%.

6. A device as claimed in claim 1, wherein said rotating means comprises a hollow drive shaft coaxially secured at one end to said open end of said cavity.

7. A device as claimed in claim 6, wherein said feeding means comprise an inlet tube passing through said hollow drive shaft and having an end in the region of said open end of the cavity, a container adapted to contain the material to be analysed and communicating with the end of said tube distant from said rotary disk electrode, and sealing means between the other end of said drive shaft and said tube.

8. A device as claimed in claim 7, and including means for regulating flow of material from said container into said tube.

9. A device as claimed in claim 1, wherein the solution to be analyzed is fed into said cavity at a pressure of 80–100 mm. water column.

References Cited

UNITED STATES PATENTS 2,920,201   1/1960   Annis et al. _____ 356—86

OTHER REFERENCES

Direct Spectrochemical Analysis of Solutions, Cyrus Feildman, Analytical Chemistry, vol. 21, No. 9, September 1949, pp. 1041–1046.

RONALD L. WIBERT, Primary Examiner

V. P. McGRAW, Assistant Examiner

U.S. Cl. X.R.

313—231; 314—22